(12) United States Patent
Matsen et al.

(10) Patent No.: US 11,220,064 B2
(45) Date of Patent: Jan. 11, 2022

(54) METHODS AND APPARATUS FOR FABRICATING PANELS

(71) Applicant: The Boeing Company, Chicago, IL (US)

(72) Inventors: Marc R. Matsen, Seattle, WA (US); Bret Alan McGinness Voss, Tukwila, WA (US); Vincent C. Ku, Mukilteo, WA (US); Christopher J. Hottes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 79 days.

(21) Appl. No.: 16/132,311

(22) Filed: Sep. 14, 2018

(65) Prior Publication Data

US 2020/0086582 A1  Mar. 19, 2020

(51) Int. Cl.
| | |
|---|---|
| *B29C 65/36* | (2006.01) |
| *B29C 65/00* | (2006.01) |
| *B64C 1/12* | (2006.01) |
| *B64C 25/16* | (2006.01) |
| *B32B 37/14* | (2006.01) |
| *B64C 1/00* | (2006.01) |
| *B29L 31/30* | (2006.01) |

(52) U.S. Cl.
CPC .......... *B29C 65/36* (2013.01); *B29C 66/1312* (2013.01); *B29C 66/7212* (2013.01); *B32B 37/142* (2013.01); *B64C 1/12* (2013.01); *B64C 25/16* (2013.01); *B29L 2031/3076* (2013.01); *B32B 2310/12* (2013.01); *B64C 2001/0072* (2013.01); *Y10T 428/24174* (2015.01); *Y10T 428/24182* (2015.01)

(58) Field of Classification Search
CPC . B29C 65/36; B29C 66/1312; B29C 66/7212; B32B 37/142; B32B 2310/12; B64C 1/12; B64C 25/16; B64C 2001/0072; Y10T 428/24182; Y10T 428/24174; B29L 2031/3076; B64F 5/10
See application file for complete search history.

(56) References Cited

U.S. PATENT DOCUMENTS

| | | | | |
|---|---|---|---|---|
| 5,034,256 A | * | 7/1991 | Santiso, III | B32B 27/08 428/73 |
| 5,717,191 A | * | 2/1998 | Christensen | B29C 66/524 219/634 |
| 2008/0179448 A1 | * | 7/2008 | Layland | H05B 3/28 244/1 N |
| 2011/0244150 A1 | * | 10/2011 | Thrash | B64D 29/00 428/34.1 |
| 2019/0161199 A1 | * | 5/2019 | Lacko | B64D 33/06 |

* cited by examiner

*Primary Examiner* — David Sample
*Assistant Examiner* — Donald M Flores, Jr.

(57) ABSTRACT

A composite sandwich panel includes a first composite part and a second composite part. A plurality of stiffeners extend between the first and second composite parts. A fiberglass composite perimeter edge closeout is positioned along one or more edges of the first and second composite parts. The fiberglass composite perimeter edge closeout controls a magnetic flux to bond the first and second composite parts to the plurality of stiffeners.

15 Claims, 8 Drawing Sheets

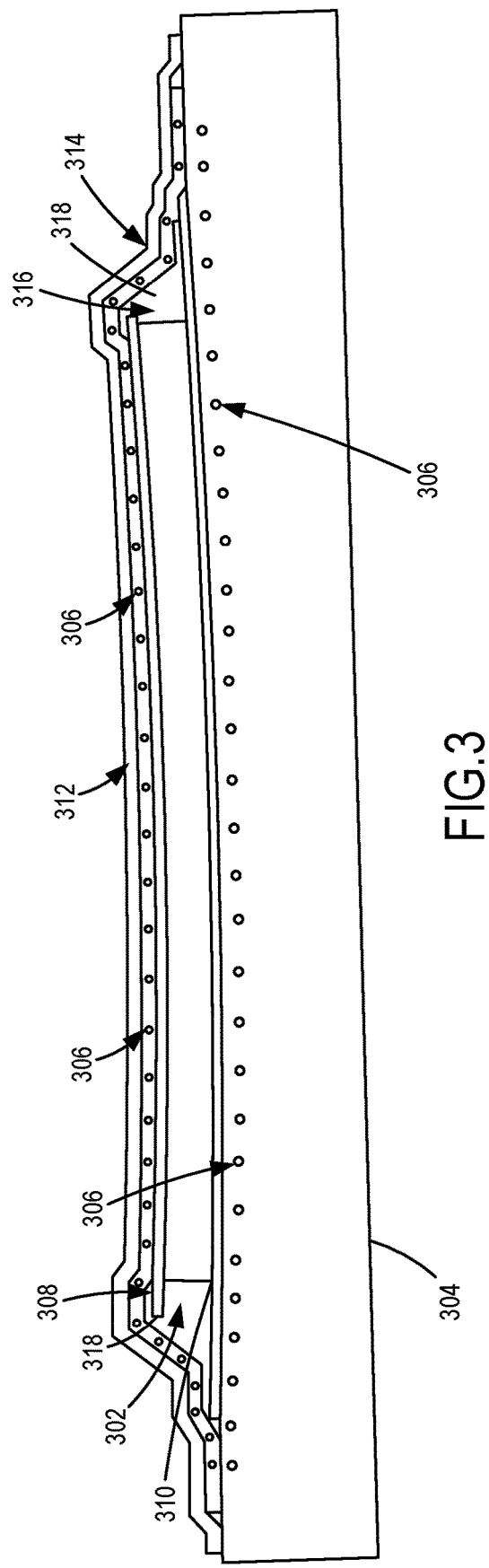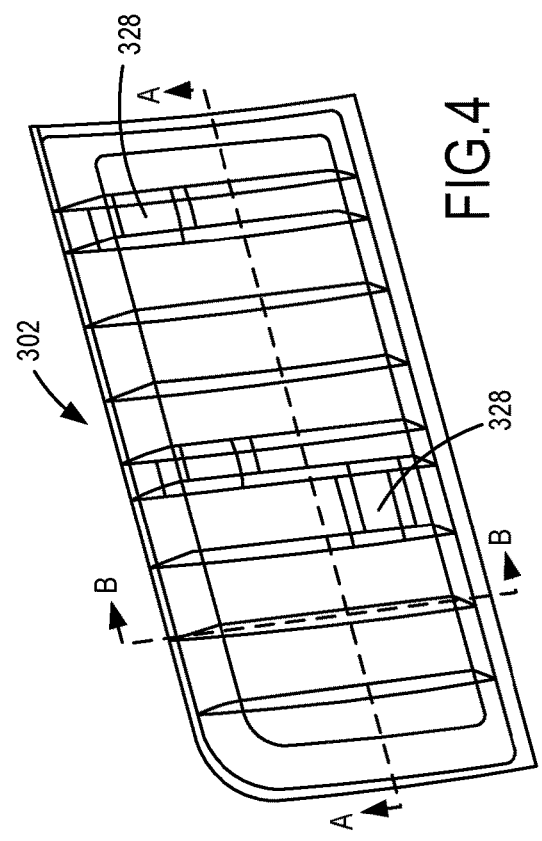

METHODS AND APPARATUS FOR FABRICATING PANELS

This invention was made with Government support under NNL09AA00A awarded by NASA. The government has certain rights in this invention.

BACKGROUND

Different techniques can be used to form plastic products, such as fabricating thermoplastic panels for aircraft. For example, aircraft are being designed and manufactured with greater percentages of composite materials. Composite materials are used in aircraft to decrease the weight of the aircraft. This decreased weight improves performance features such as payload capacity and fuel efficiency. Further, composite materials provide longer service life for various components in an aircraft.

In manufacturing composite structures, layers of composite material are typically laid on a tool. For example, layers of fibers in sheets can be laid on the tool, which then form the composite end product.

During manufacturing of composite structures, different joining technologies are used, including mechanical fastening, adhesive bonding, and welding. With respect to welding, a thermoplastic weld is created when the thermoplastic material on the surface of two composite components is heated to the melting or softening point and the two surfaces are brought into contact so that the molten thermoplastic mixes. Then, the surfaces are held in contact while the thermoplastic cools below the softening temperature to fuse the thermoplastic into the thermoplastic weld.

In composite welding, induction welding processes are often used. In these processes, the composite components are placed substantially parallel to the magnetic flux during induction welding processes. However, when the magnetic flux is not substantially parallel to a composite component, which can be difficult to achieve, undesirable heating can occur in the composite material. For example, when the fibers are electrically conductive, undesirable heating can occur in the composite material, such as heating at locations other than the welding surface. Undesirable heating can increase when the frequency is above 30 KHz.

Thus, while composite materials, such as thermoplastics, can provide improved operating features, the fabrication of these components, such as thermoplastic panels, has been problematic with no robust process to produce the components. A need exists for a controlled welding process that allows for efficient welding of joints to form the composite components, such as a sandwich panel structure. For example, it is desirable to allow for induction welding of composite components that are not positioned substantially parallel to the magnetic flux.

SUMMARY

With those needs in mind, certain examples of the present disclosure provide a composite sandwich panel that includes a first composite part and a second composite part. A plurality of stiffeners extend between the first and second composite parts. A fiberglass composite perimeter edge closeout is positioned along one or more edges of the first and second composite parts. The fiberglass composite perimeter edge closeout controls a magnetic flux to bond the first and second composite parts to the plurality of stiffeners.

In at least one example, a plurality of susceptors are positioned between one or more surfaces of (i) the first and second composite parts and (ii) the plurality of stiffeners. The fiberglass composite perimeter edge closeout is configured to direct a magnetic flux to the plurality of susceptors by forming the fiberglass composite perimeter edge from a material having dielectric material properties to control directional flux induced welding of the first and second composite parts to the plurality of stiffeners. The fiberglass composite perimeter edge closeout comprises an angled body between two planar ends in some examples.

Certain examples of the present disclosure provide a perimeter edge closeout that includes a body formed from a material having dielectric properties to control magnetic flux into a sandwich panel. The body is sized and shaped to form edges of the sandwich panel. The perimeter edge closeout further includes a pair of ends extending from the body. The pair of ends are configured to abut edges of the sandwich panel and bond thereto to form the edges of the sandwich panel as the magnetic flux is being controlled.

Certain examples of the present disclosure also provide a method for forming a composite sandwich panel. The method includes positioning components of the composite sandwich panel with respect to a plurality of induction coils and positioning a fiberglass composite panel edge closeout along edges of the components of the composite sandwich panel. The fiberglass composite perimeter edge closeout is configured to direct magnetic flux within the components of the composite sandwich panel. The method further includes generating a magnetic flux using the plurality of induction coils to bond the components of the composite sandwich panel.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein:

FIG. 3 is an illustration of a tool to assemble an aircraft landing gear door according to an embodiment of the present disclosure;

FIG. 4 is an illustration of an aircraft landing gear door formed according to an embodiment of the present disclosure;

DETAILED DESCRIPTION

Figure 1:
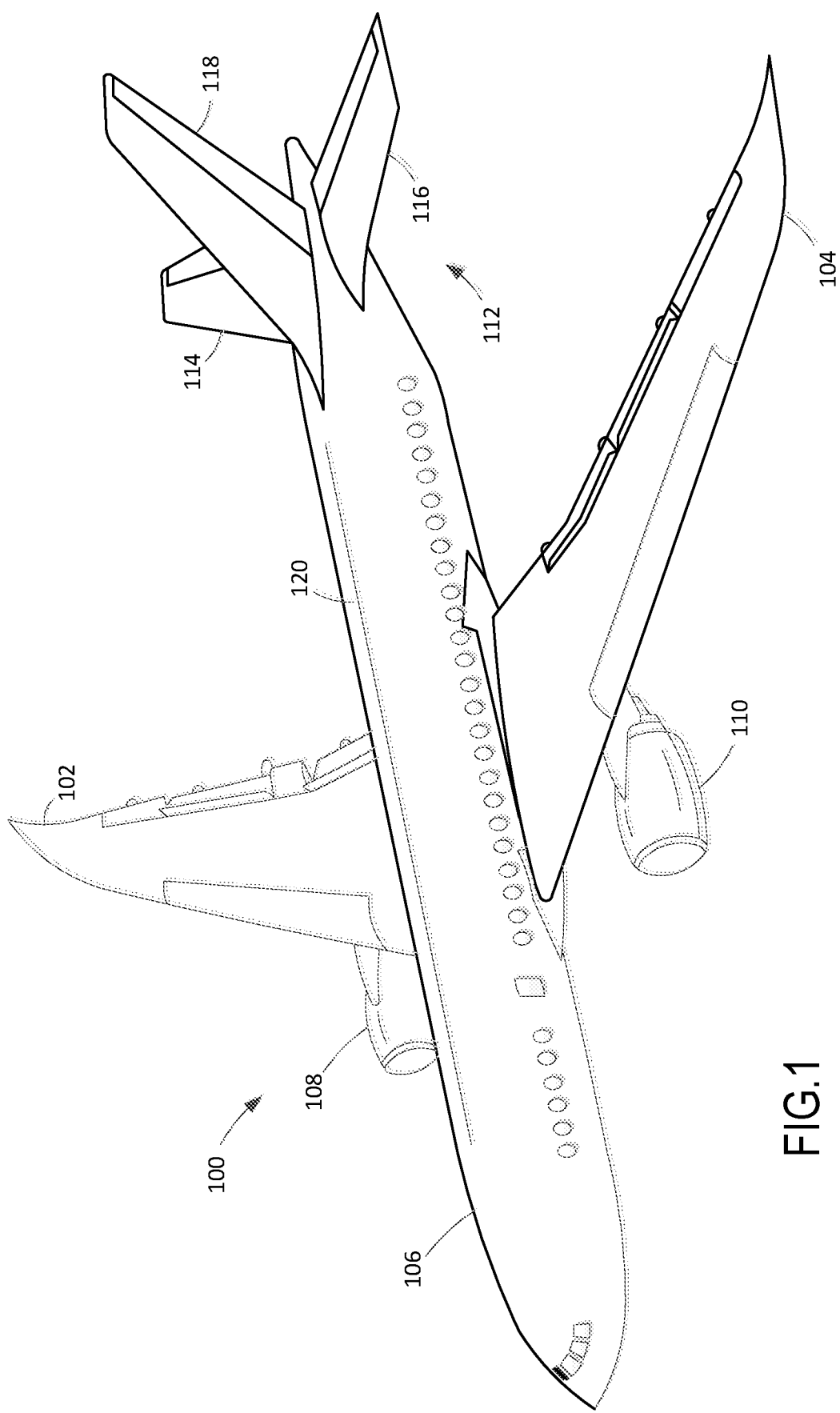
FIG. 1 is an illustration of an aircraft including composite sandwich panels according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain embodiments of the present disclosure include apparatus and methods for fabrication of plastic parts, such as thermoplastic sandwich panels. In some examples, susceptors are used for induction welding with the addition of a composite panel edge closeout that enables a magnetic field from a coil to properly interact with the parts and the susceptors. For example, susceptor wires located in joints enable rapid induction heating of the joint area to melt the thermoplastic material to produce a welded thermoplastic composite component. The composite panel edge closeout on the sandwich panel construction enables the magnetic field produced by the coil to freely stream into the inside of the sandwich panel. Additionally, the sandwich panel in some examples has planar core and facesheet elements that are parallel with the magnetic flux generated by the induction coil. This configuration with the composite panel edge closeout enables a rapid, affordable, and controlled/repeatable method for producing thermoplastic sandwich panels, which can also increase the affordability of fabrication of composite components.

In some examples, the dielectric material properties within the composite panel edge closeout are used to control directional magnetic flux induced co-cure or thermal welding of an assembled composite sandwich panel. The illustrative examples recognize and take into account that even and parallel lines of magnetic flux can be produced in the interior of a solenoidal coil. A tool having a solenoidal coil can then be used to weld components formed of composite material to form a structure in accordance with some examples.

One or more examples allow for fabrication of composite parts, such as thermoplastic aircraft parts for an aircraft 100 as illustrated in FIG. 1. The aircraft 100 has a wing 102 and a wing 104 attached to a body 106. The aircraft 100 also includes an engine 108 attached to the wing 102 and an engine 110 attached to the wing 104. The body 106 has a tail section 112 with a horizontal stabilizer 114, a horizontal stabilizer 116, and a vertical stabilizer 118 attached to the tail section 112 of the body 106. The body 106 in some examples has a composite skin 120.

The aircraft 100 is an example of an aircraft in which welded thermoplastic structures can be implemented in accordance with various examples described herein. In one particular example as described in more detail herein, the landing gear door (not shown in FIG. 1) of the aircraft 100 is a welded thermoplastic structure formed according to the present disclosure. In other examples, a structural support such as a spar, rib, or other structural support of the wing 102, the wing 104, or the body 106 welded to another component comprises a thermoplastic structure. For example, a structural support of the body 106 welded to the composite skin 120 can comprise a welded thermoplastic structure.

The illustration of the aircraft 100 is not meant to imply physical or architectural limitations to the manner in which an illustrative configurations can be implemented. For example, although the aircraft 100 is a commercial aircraft, the aircraft 100 can be a military aircraft, a rotorcraft, a helicopter, an unmanned aerial vehicle, or any other suitable aircraft.

Additionally, although the illustrative examples are described with respect to an aircraft, the present disclosure can be applied to other types of platforms. The platform can be, for example, a mobile platform, a stationary platform, a land-based structure, an aquatic-based structure, and a space-based structure. More specifically, the platform can be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
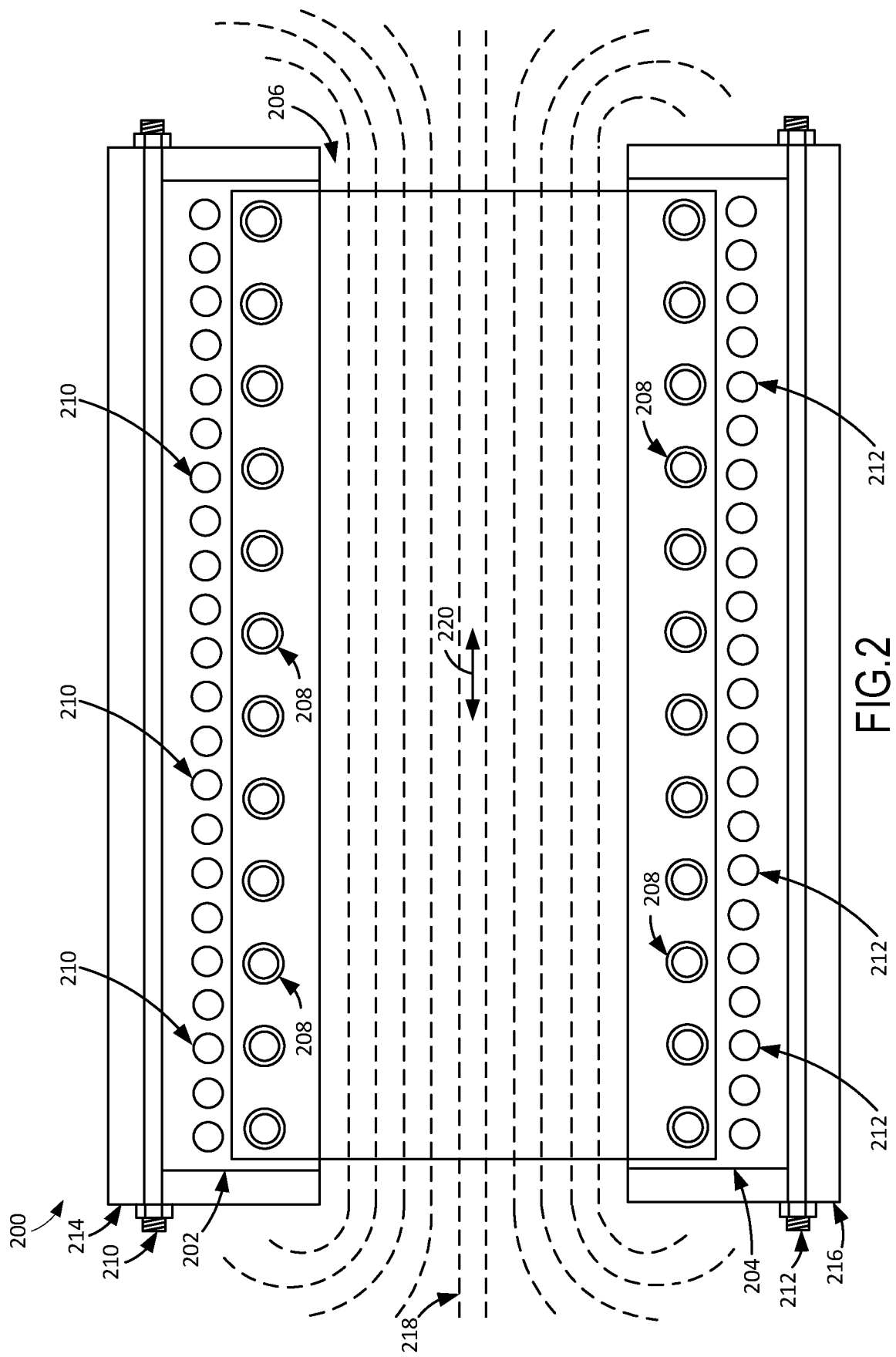
FIG. 2 is an illustration of a cross-sectional view of a tool according to an embodiment of the present disclosure.

FIG. 2 illustrates a tool 200 in one example used to perform induction welding of thermoplastics using susceptors. In some examples, the susceptors are configured as die liners positioned within elements used to weld the thermoplastic part and that generate heat when exposed to a magnetic field generated by the tool. In the illustrated example, the tool 200 has a first die 202 and second die 204 forming a die cavity 206 of the tool 200. It should be appreciated that the illustrated configuration having first and second dies 202 and 204 is merely for example and other configurations are contemplated. For example, configurations having only one die, or using a combination of resin tooling components and elastomeric layers are contemplated as described herein, such as illustrated in FIG. 3.

A plurality of induction coils 208 runs through the first die 202 and the second die 204. The plurality of induction coils 208 are joined by flexible sections (not shown) in some examples. A plurality of rods 210 runs through the first die 202 and a plurality of rods 212 runs through the second die 204. The first die 202 and the second die 204 are held within a load constraint 214 and a load constraint 216. For example, the first and second dies 202 and 204 are attached in the load constraints 214 and 216, respectively, by any suitable fastening device such as bolting or clamping.

In operation, the plurality of induction coils 208 generates magnetic flux 218. More particularly, the magnetic flux 218 travels in a direction 220 perpendicular to the plurality of induction coils 208 in the die cavity 206. As will be described in more detail herein, the magnetic flux 218 causes the susceptors to generate heat to induction weld a thermoplastic part. For example, the tool 200 is configured to weld a structure, such as a thermoplastic aircraft part. As used herein, welding can include applying elevated temperature, elevated pressure, or elevated temperature and pressure to a thermoplastic material, such that the thermoplastic material flows. The welding results in joining at least two components to form a structure in some examples.

One particular example includes a tool 300 to perform induction welding of thermoplastics using susceptors as illustrated in FIG. 3 (which is a cross-sectional view taken along the line B-B of FIG. 4). The tool 300 is configured as a joining system for forming a landing gear door 302 (shown in FIG. 4) for an aircraft. In the illustrated example, the tool 300 includes resin tooling 304 that includes a plurality of induction coils 306 configured to generate magnetic flux. In one example, the resin tooling 304 is fabricated using an additive manufacturing process. It should be appreciated that in some examples, the resin tooling 304 is embodied as the first die 202 or the second die 204 having the plurality of induction coils 208 as illustrated in more detail in FIG. 2.

In some examples, the plurality of induction coils 306 are conformable induction coils formed of a thin gauge wire. In particular, in one example, the plurality of induction coils 306 comprise a plurality of lengths of Litz wire. Litz wire in various example is a graded fine copper wire used to carry high frequency current. Thus, the plurality of induction coils 306 in some examples are conformable to have greater flexibility and when formed of Litz wires, can have lower resistive losses and reduced weight. However, it should be appreciated that the plurality of induction coils 306 can be formed from different materials or elements, which in some examples include rigid induction tooling with induction coils embedded within the resin tooling 304.

By using at least some conformable induction coils instead of conventional rigid induction tooling with induction coils embedded in the tools, a magnetic field generator can be used to form structures of varying cross-sections, such as the landing gear door 302. Further, by using conformable induction coils, the magnetic field generator can be less expensive than conventional induction tooling. Yet further, by using conformable induction coils, the magnetic field generator can use fewer resources to store and transport the magnetic field generator.

In the illustrated example, one or more elastomeric materials and induction coils 306 configured as conformable induction coil can extend across the full length of the landing gear door 302. For example, the induction coils 306 can extend across the full length of composite parts 308 and 310 used to form the landing gear door 302. However, it should be appreciated that in some examples, the induction coils 306 extend less than the full length of one of one or more of the composite parts 308 and 310. In some examples, the induction coils 306 only extend such that a magnetic field is generated in desired area. Additionally, the size, shape and spacing between the induction coils 306 can be varied as desired or needed, such as based on the part to be induction welded, the desired magnetic field, etc.

The tool 300 further includes a magnetically permeable material, illustrated as an elastomer layer 312 (also referred to as an elastomeric layer) that comprises induction coils 306 embedded therein (i.e., embedded induction coils). In one example, the induction coils 306 are Litz wires embedded within the elastomer layer 312. The elastomer layer 312 is positioned on an opposite side of the composite parts 308 and 310 to the resin tooling 304. Thus, in the example of FIG. 3, the composite parts 308 and 310 rest on the resin tooling 304 prior to and during the joining of the composite parts 308 and 310 as described in more detail herein.

Additionally, the composite parts 308 and 310 are covered by a vacuum bag 314 (e.g., a Torr® bag). By sealing the vacuum bag 314 to the resin tooling 304, which can be accomplished using any vacuum sealing technique, a vacuum chamber 316 is thereby formed. Thus, in some examples, a vacuum is drawn within the vacuum chamber 316 that forms a sealed cavity. It should be appreciated that in some examples, an inert gas can be introduced into the sealed cavity.

In the illustrated example, the elastomer layer 312 is positioned within the vacuum bag 314 such that when the vacuum chamber 316 is formed, the elastomer layer 312 is drawn toward the composite part 308. As such, the induction coils 306 are positioned along and adjacent to a wall of the composite part 308 when the vacuum bag 314 is positioned over the elastomer layer 312 and sealed to the resin tooling 304. It should be appreciated that in some examples, the elastomer layer 312 is attached to the vacuum bag 314, such as stitched within an inner wall of the vacuum bag 314. Additionally, it should be appreciated that the elastomer layer 312 can be formed from one or more elastomeric sheets present between the vacuum bag 314 and the composite part 308 (e.g., thermoplastic part).

In the illustrated embodiment, an end piece, which is configured as a fiberglass composite perimeter edge closeout 318 in some examples, is positioned along edges or ends of the composite parts 308 and 310. In one example, the fiberglass composite perimeter edge closeout 318 is a fiberglass reinforced thermoplastic panel perimeter closeout part positioned along or on each end of the composite parts 308 and 310. More particularly, the fiberglass composite perimeter edge closeout 318 closes the open ends of the composite parts 308 and 310 by extending from the composite part 308 to the composite part 310 within the vacuum bag 314. As more clearly shown in FIGS. 5 and 6, the fiberglass composite perimeter edge closeout 318 is positioned in abutting engagement with the composite parts 308 and 310. In one example, the composite parts 308 and 310 are configured as consolidated thermoplastic inner and outer skins of the landing gear door 302.

The fiberglass composite perimeter edge closeout 318 is sized and shaped to accommodate the dimensions of ends 320 of the composite parts 308 and 310. In the illustrated example, the fiberglass composite perimeter edge closeout 318 has an angled body 322 between two planar ends 324 that extend along a surface of the composite parts 308 and 310. Thus, in the illustrated example, the fiberglass composite perimeter edge closeout 318 can be considered "S" shaped. However, different shapes and dimensions of the fiberglass composite perimeter edge closeout 318 are contemplated based on the size and shape of the composite parts 308 and 310.

The fiberglass composite perimeter edge closeouts 318 are positioned at the ends 320 of the composite parts 308 and 310 in some examples to forms the edge surface of the landing gear door 302. Thus, it should be appreciated that in some examples, the fiberglass composite perimeter edge closeout 318 is sized and shaped based on the requirements for the landing gear door 302, such as aerodynamic requirements for the edges of the landing gear door 302, fitting or tolerance requirements for the ends of the landing gear door 302, etc.

The fiberglass composite perimeter edge closeout 318 is a separate component made of fiberglass/thermoplastic (e.g., fiberglass reinforced thermoplastic) for the edge closeout. The fiberglass composite perimeter edge closeout 318 is configured to allow the magnetic flux to stream into the interior region between the composite parts 308 and 310. The magnetic flux stream is due in part to the dielectric properties of the fiberglass.

Figure 5:
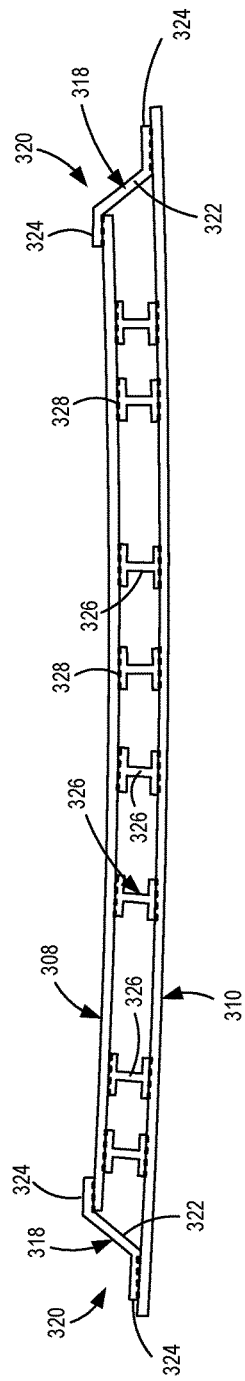
FIG. 5 is a cross-sectional view of the aircraft landing gear door of FIG. 4.
Figure 6:
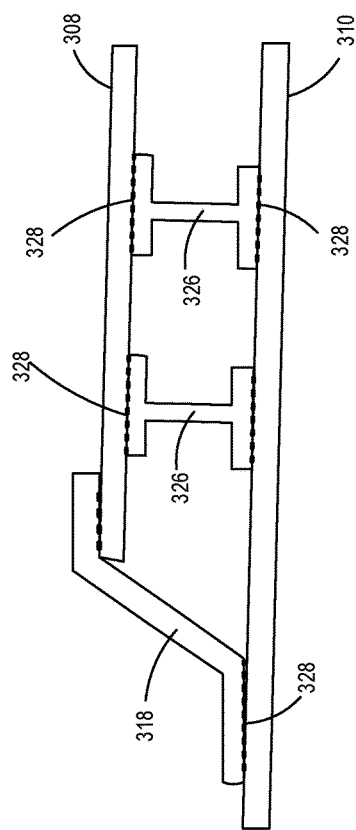
FIG. 6 is a partial cross-sectional view of the aircraft landing gear door of FIG. 4 showing a fiberglass composite perimeter edge closeout according to an embodiment of the present disclosure.

As can further be seen in FIGS. 5 and 6 (which are cross-sectional views taken along the line A-A of FIG. 4), a plurality of stiffeners 326 are positioned between the composite parts 308 and 310. The plurality of stiffeners 326 are spaced apart within between the composite parts 308 and 310. The number and spacing of the plurality of stiffeners 326 can be varied as desired or needed, such as based on stiffness requirements for the landing gear door 302. The number and spacing of the plurality of stiffeners 326 is, thus, shown only for illustration. That is, the plurality of stiffeners 326 illustrate that the stiffeners 326 can be positioned anywhere between the composite parts 308 and 310 and have the same or different spacing therebetween. The plurality of stiffeners 326 are positioned in some examples to provide a desired or required level of stiffness or support to one or more portions of the landing gear door 302.

The plurality of stiffeners 326 in the illustrated example are configured as I-beam stiffeners, for example, thermoplastic I-beam stiffeners having a length that extends between the composite parts 308 and 310. It should be appreciated that the plurality of stiffeners 326 can have different shapes and dimensions as desired or needed.

A plurality of susceptors 328 (e.g., smart susceptors) are positioned between ends of the plurality of stiffeners 326 and the composite parts 308 and 310, and between ends of the fiberglass composite perimeter edge closeouts 318 and the composite parts 308 and 310. In some examples, the plurality of susceptors 328 are configured as susceptor wires and positioned between surfaces of the plurality of stiffeners 326 and surfaces of the fiberglass composite perimeter edge closeouts 318 that abut or are in contact with the composite parts 308 and 310. It should be noted that the plurality of susceptors 328 illustrated in some examples are a subset of the total number of susceptors 328 that are included. That is, the plurality of susceptors 328 are shown for ease in illustration and additional susceptors 328 are provided between the various parts in some examples.

The plurality of susceptors 328 are formed of a material configured to generate heat when exposed to a magnetic flux in various examples. The material of the plurality of susceptors 328 can be, for example, a metal, a metal alloy, a ceramic, a metalized film, or any other suitable material. In some examples, the plurality of susceptors 328 comprise a metallic alloy having ferromagnetic properties. In some examples, a ferromagnetic material for the plurality of susceptors 328 is selected based on a desired welding temperature. For example, the material for the plurality of susceptors 328 is selected based on a temperature at which a ferromagnetic material becomes non-magnetic. This temperature is also known as a Curie temperature. A ferromagnetic material in some examples is selected for the plurality of susceptors 328 such that the Curie temperature for the ferromagnetic material corresponds to a desired welding temperature.

The plurality of susceptors 328 in some examples are configured as wires that at low temperature have a magnetic permeability that is high and, thus, the skin depth is small and the magnetic field induces strong eddy currents generating lots of heat; and at higher temperatures have a magnetic permeability that is small and, thus, skin depth is larger than the radius so currents interfere and are weak and generate less heat. The wires forming the plurality of susceptors 328 have a diameter of 0.01 inches in one example. However, the diameter, and other characteristics of the plurality of susceptors 328 can be varied as desired or needed, such as based on magnetic permeability requirements.

In operation, the plurality of susceptors 328 generate heat when exposed to a magnetic flux generated by the induction coils 306. The plurality of susceptors 328 are used to apply heat to a number of joining points of the composite parts 308 and 310 during a welding process as described herein. That is, the plurality of susceptors 328 are placed between components to promote welding thereof, particularly induction welding. The susceptors 328 can be placed in different orientations. In one example, the plurality of susceptors 328 are placed substantially parallel to a direction of the magnetic flux. When a magnetic field is applied, induced currents are generated circumferentially around susceptor wires. It should be noted that thermal leveling of the heated plurality of susceptors 328 can be reached at a desired welding temperature due to the decay of the magnetic properties of the wires of the plurality of susceptors 328.

In some examples, the susceptors 328 are placed at all surfaces to be joined. The configuration of various examples allow for the plurality of stiffeners 326, the composite parts 308 and 310 (e.g., thermoplastic inner and outer skins) and the fiberglass composite perimeter edge closeouts 318 to be welded in one step. That is, with the application of a magnetic field, the susceptors 328 cause the abutting surfaces to be induction welded together.

As one example, susceptor thermoplastic welding of a landing gear door is performed as follows:

1. Assemble and load parts onto the tool 300 (includes susceptors 328).
2. Place Litz wire blanket (e.g., the elastomer layer 312) and the vacuum bag 314 over the stack-up.
3. Pull vacuum between the vacuum bag 314 and the tool 300.
4. Energize the induction coils 306 using a 150 KHz to 300 KHz current.
5. Maintain the current from 1 to 3 minutes.
6. Turn off power and let cool for 10 to 15 minutes and remove from tool 300.

It should be noted that the process described above can be varied as desired or needed, such as based on the welding requirements for the part. For example, the frequency to energize the induction coil and/or the amount of time the current is maintained can be varied to suit different induction welding applications, such as to form different types of parts.

Figure 7:
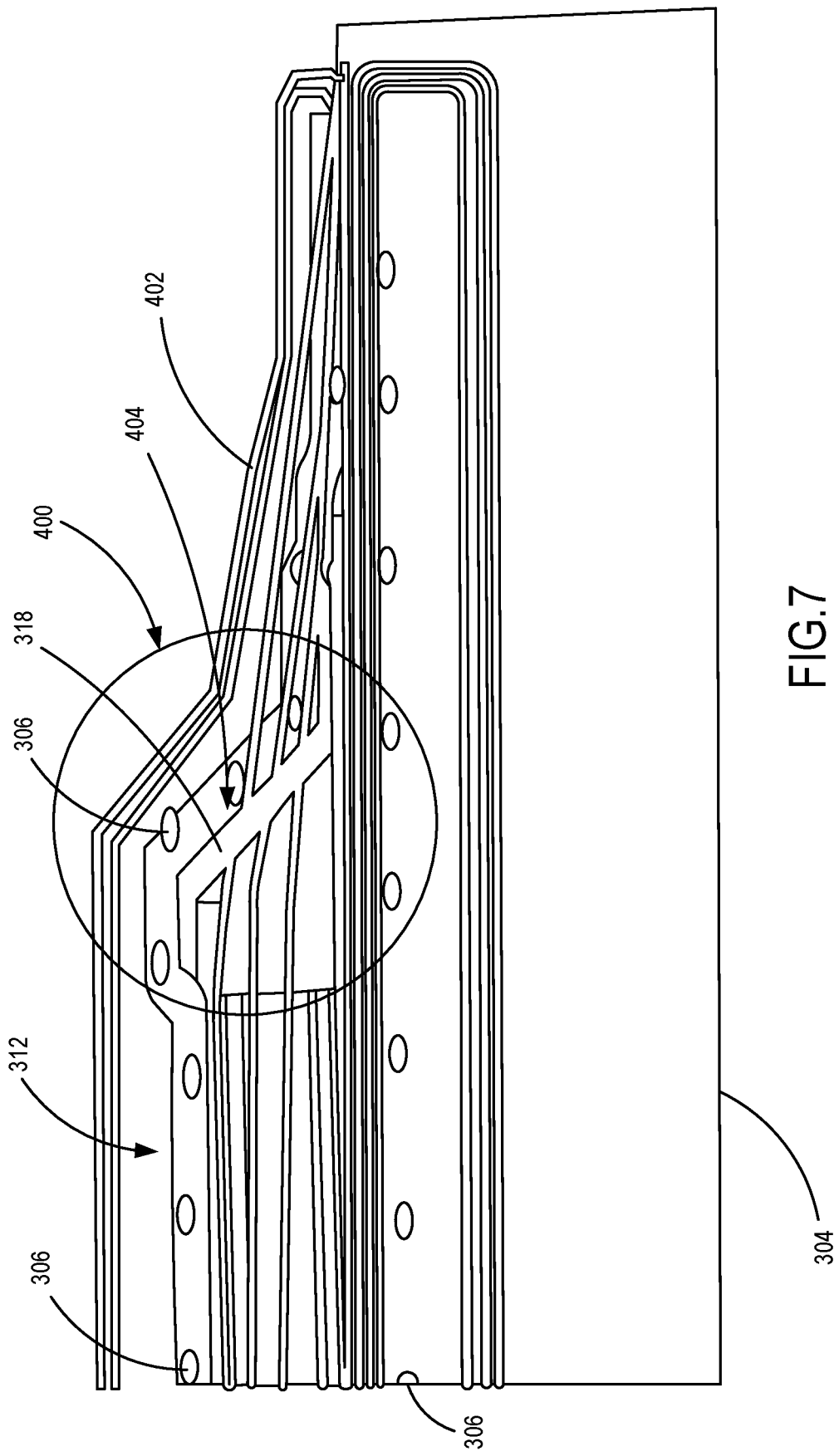
FIG. 7 is a diagram illustrating control of magnetic flux using a fiberglass composite perimeter edge closeout according to an embodiment of the present disclosure.

As shown in FIG. 7, the magnetic field (as illustrated by the magnetic flux lines 402) generated by the induction coils 306 impinges on the fiberglass composite perimeter edge closeout 318 at the location 400. However, as illustrated at 404, the dielectric properties of the fiberglass composite perimeter edge closeout 318 prevents induced currents, and controls the direction of the magnetic flux to be within the structure.

It should be noted that if the magnetic field is non-planar to the surface of the fiberglass composite perimeter edge closeout 318, then induced current is generated in the fiber architecture. That is, when components cannot be located parallel to the oscillating magnetic flux produced by the coil, internal inductive heating of the composite material itself can occur. For example, when the frequency is above 30 KHz, undesirable heating can occur in portions of a composite component that are positioned substantially perpendicular to the oscillating magnetic flux. When a composite component is substantially perpendicular to the magnetic flux, an eddy current is able to swirl in a circular pattern in the surface of the component. Electrons can be driven in a circular pattern from graphite fiber to graphite fiber of the composite component. When the composite component is substantially perpendicular to the magnetic flux, the eddy current can produce undesirable heating.

With the fiberglass composite perimeter edge closeout 318 of various examples of the present disclosure, all of the surfaces of the graphite reinforced components are parallel to the flow of the magnetic field. Therefore, the induced heat is isolated to the weld joints, specifically to the location of the susceptors 328 in various examples.

Thus, various examples use the dielectric material properties within the fiberglass composite perimeter edge closeout 318 to control directional magnetic flux induced co-cure of an assembled composite sandwich panel (e.g., the landing gear door 302). That is, the fiberglass composite perimeter edge closeout 318 functions to redirect or stream the magnetic flux field back within an assembled composite sandwich panel. To facilitate bonding, susceptor resin assemblies (e.g., the susceptors 328) are placed at the co-bonding interface flange faces such that the energy field acting on the susceptor resin assemblies weld the pre-aligned and assembled structure into a single part detail. As such, the dielectric properties of the fiberglass composite perimeter edge closeout 318 streams the flux field within the panel assembly to cause the susceptor wires placed at all surfaces of thermoplastic to be welded or joined to be heated to co-bong the surfaces.

Various examples allow for assembly of composite sandwich panels using controlled directional magnetic flux induced co-cure or thermal welding in a single manufacturing process. The fiberglass composite perimeter edge closeout 318 controls the directional magnetic flux to cause heating of the susceptors 328 in some examples that co-bond adjacent parts. Different composite sandwich panels can be assembled or form in accordance with the present disclosure. For example, the landing gear door 302 (shown in FIG. 4) can be assembled in a single manufacturing step.

Figure 8:
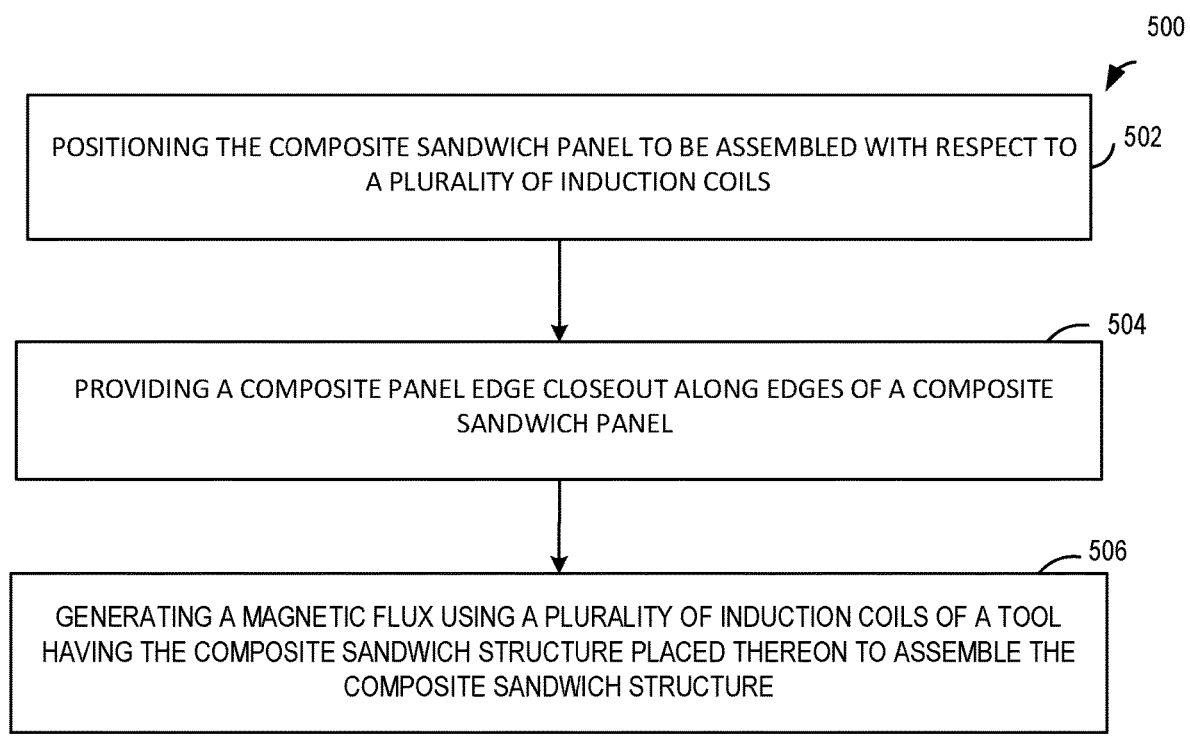
FIG. 8 is a flow chart illustrating a method for forming a composite sandwich panel according to an embodiment of the present disclosure.

FIG. 8 is an illustration of a flowchart of a method 500 for forming a composite sandwich panel in accordance with one or more examples. The method 500 can be implemented, for example, to assemble the landing gear door 302 by directing magnetic flux to facilitate co-bonding of various parts, and that blocks magnetic flux from encountering composite material at a substantially non-parallel angle. It should be noted that the steps in the method 500 can be performed in a different order than shown, one or more steps can be added or removed, and the steps can be performed concurrently, simultaneously or sequentially.

The method 500 includes positioning the composite sandwich panel to be assembled with respect to a plurality of induction coils at 502. In some examples, the induction coils are configured within a tool and a elastomeric layer that covers the composite sandwich panel to generate the magnetic flux, which can include creating a vacuum within a vacuum bag having the parts for the composite sandwich panel to be assembled therein.

At 504, the method 500 includes providing a composite panel edge closeout along edges of a composite sandwich panel. For example, the fiberglass composite perimeter edge closeout 318 is positioned along edges of composite sandwich panel components, such as thermoplastic inner and outer skins having thermoplastic stiffeners positioned therebetween. The composite sandwich panel also includes susceptors or other magnetically induced bonding members positioned between surfaces to be bonded as described herein.

At 506, a magnetic flux is generated using a plurality of induction coils of a tool having the composite sandwich panel placed thereon. For example, the induction coils are energized, which results in an electrical current to flow within and heat the susceptors. That is, as described herein, the fiberglass composite perimeter edge closeout 318 directs the flow of the magnetic flux to cause the susceptors to heat up and bond adjacent parts.

In some examples, the method 500 uses the dielectric material properties within the composite panel edge closeout (e.g., the fiberglass composite perimeter edge closeout 318) to control directional magnetic flux induced co-cure or thermal welding of the assembled composite sandwich panel. The fiberglass composite panel perimeter edge closeout can have specific dielectric material properties to control the directional magnetic flux induced co-cure of the assembled composite sandwich panel. For example, the dielectric material properties cause the magnetic flux field to be re-directed or streamed within the assembled composite sandwich panel where the energy field acting on susceptors resin assemblies placed at the co-bonding interface flange faces function to weld the pre-aligned and assembled structure into a single part detail. Thus, the fiberglass composite perimeter edge closeout 318 directs the magnetic flux to a number of joints between components to be bonded.

It should be noted that one or more components used to assemble the composite sandwich panel are formed of a material that is magnetically opaque to a frequency in the range of 30 KHz to 350 KHz in some examples. However, different material can be used to be magnetically opaque at other frequencies. In the method 500, the elastomeric layer or tooling can be formed of the magnetically opaque material.

Figure 9:
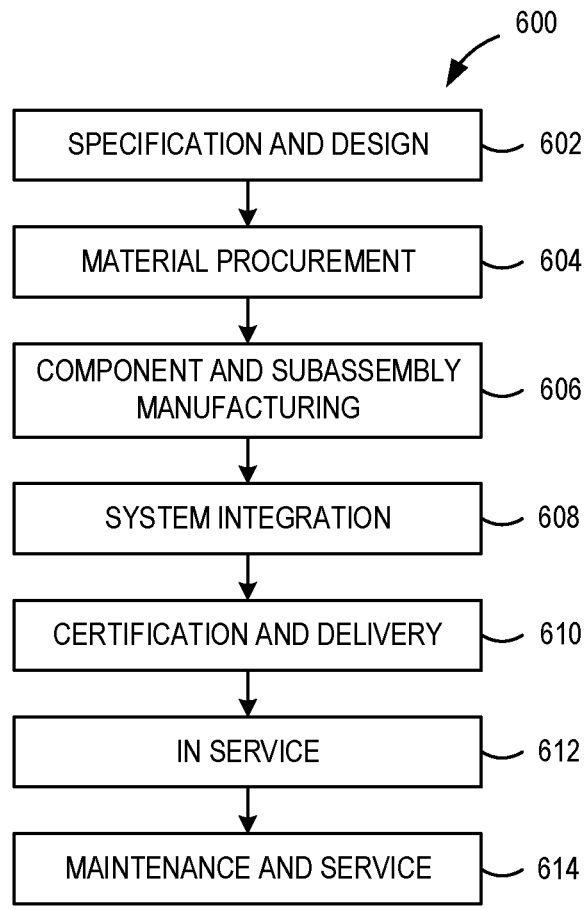
FIG. 9 is a block diagram of an aircraft production and service methodology.

Examples of the disclosure can be described in the context of an aircraft manufacturing and service method 600 as shown in FIG. 9. During pre-production, illustrative method 600 can include specification and design 602 of an aircraft (e.g., aircraft 100 shown in FIG. 1) and material procurement 604. During production, component and subassembly manufacturing 606 and system integration 608 of the aircraft take place. Thereafter, the aircraft can go through certification and delivery 610 to be placed in service 612. While in service by a customer, the aircraft is scheduled for routine maintenance and service 614 (which can also include modification, reconfiguration, refurbishment, and so on).

Each of the processes of the illustrative method 600 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as the automotive industry.

Apparatus and methods shown or described herein can be employed during any one or more of the stages of the manufacturing and service method 600. For example, components or subassemblies corresponding to component and subassembly manufacturing 606 can be fabricated or manufactured in a manner similar to components or subassemblies produced while the aircraft is in service. Also, one or more aspects of the apparatus, method, or combination thereof can be utilized during the production states of subassembly manufacturing 606 and system integration 608, for example, by substantially expediting assembly of or reducing the cost of the aircraft. Similarly, one or more aspects of the apparatus or method realizations, or a combination thereof, cab be utilized, for example and without limitation, while the aircraft is in service, e.g., maintenance and service 614.

Thus, various examples facilitate induction welding of composite sandwich panels. The present disclosure, including the examples described herein, can be implemented using different manufacturing environments. An example of one manufacturing environment will now be described.

Exemplary Manufacturing Environment

Figure 10:
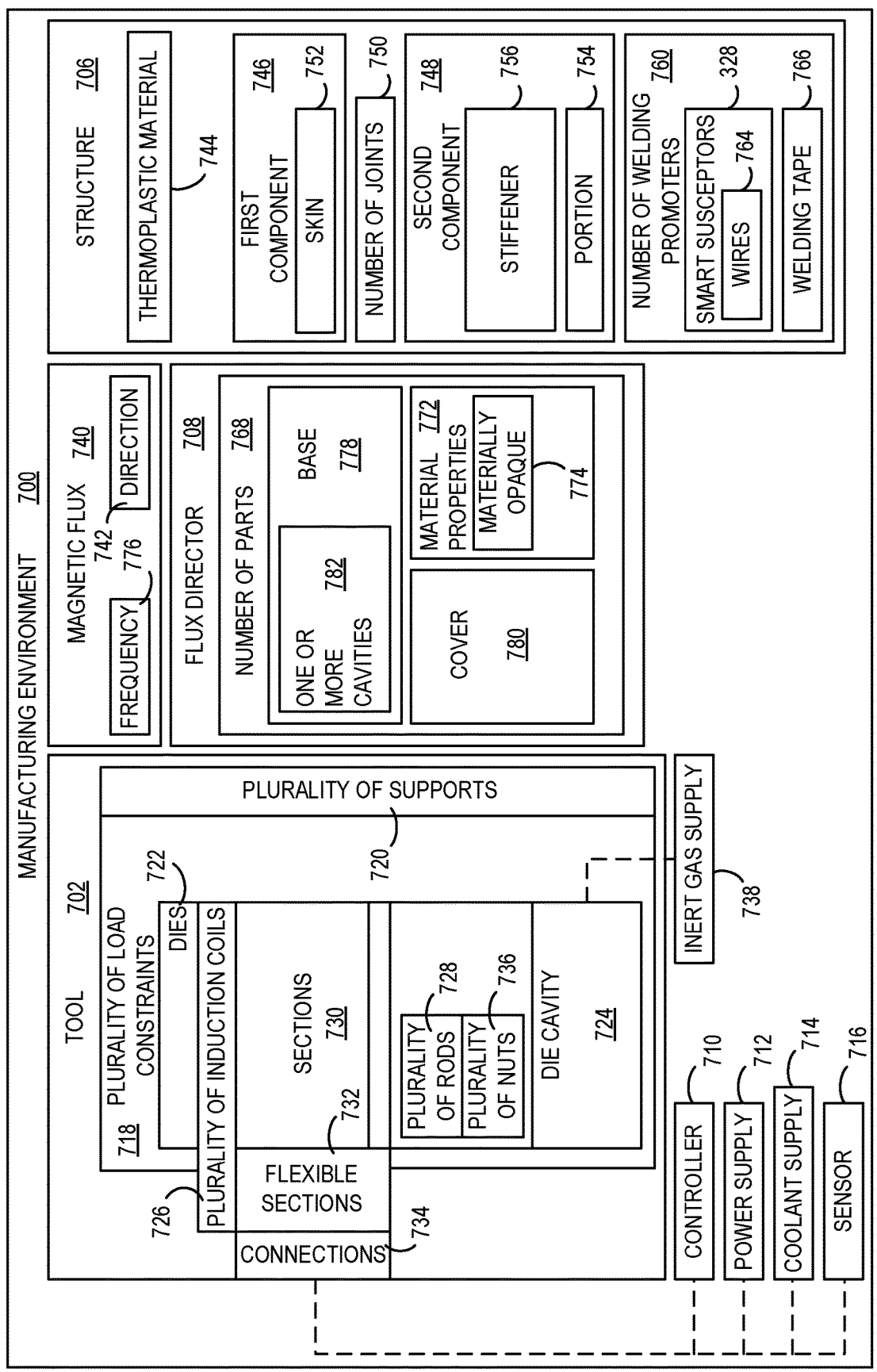
FIG. 10 is a block diagram of a manufacturing environment according to an embodiment of the present disclosure.

The present disclosure in operable within a manufacturing environment 700 as illustrated in the functional diagram of FIG. 10. In this illustrative example, the manufacturing environment 700 is depicted in block form to illustrate different components for one or more illustrative examples. In this depicted example, the manufacturing environment 700 generally includes a tool 702, a structure 706, a flux director 708, a controller 710, a power supply 712, a coolant supply 714, and a sensor 716.

The tool 702 is configured to weld a structure 706, such as to induction weld a composite sandwich panel. Welding in various examples results in joining at least two components to form the structure 706.

The tool 702 comprises a plurality of load constraints 718 supported by a plurality of supports 720. The tool 702 also comprises one or more dies 722 located within a plurality of load constraints 718. A die cavity 724 is created in some examples and configured to contain the structure 706 during assembling the process (e.g., a vacuum cavity wherein the structure 706 is maintained during induction welding).

The die(s) 722 can be formed of a material that is not susceptible to inductive heating. In some examples, the die(s) 722 are formed from a ceramic, a composite, a phenolic, or some other desirable material. In one example, the material for the die(s) 722 is selected based on a coefficient of thermal expansion, thermal shock resistance, and/or compression strength. In this example, the material can be selected to have a low coefficient of thermal expansion, desirable thermal shock resistance, and relatively high compression strength. In one example, the die(s) 722 can be a castable fused silica ceramic.

The die(s) 722 contain a plurality of induction coils 726 and plurality of rods 728. The plurality of induction coils 726 have sections 730 and flexible sections 732, such as embedded within an elastomeric layer, in some examples as described herein. The sections 730 of plurality of induction coils 726 are also embedded in the die(s) 722 in various examples. In some examples, the sections 730 extend along the length of the die(s) 722.

The plurality of induction coils 726 are connected to the controller 710, the power supply 712, the coolant supply 714, and the sensor 716 through connectors 734. The controller 710 is configured to control the input power fed to plurality of induction coils 726 by the power supply 712. By controlling the input power, the controller 710 controls the magnetic flux produced by plurality of induction coils 726. By controlling the magnetic flux produced by plurality of induction coils 726, the controller 710 also controls the operating temperature of the tool 702.

The controller 710 can be implemented in software, hardware, firmware or a combination thereof. When software is used, the operations performed by the controller 710 can be implemented in program code configured to run on a processor. When firmware is used, the operations performed by controller 710 can be implemented in program code and data and stored in persistent memory to run on a processor. When hardware is employed, the hardware can include circuits that operate to perform the operations in the controller 710.

The coolant supply 714 is configured to supply coolant to one or more coils of the plurality of induction coils 726. The coolant flowing through the plurality of induction coils 726 functions as a heat exchanger to transfer heat out of the tool 702. The sensor 716 is configured to measure a temperature of a portion of the tool 702 during operation.

The plurality of rods 728 are embedded within the die(s) 722. The plurality of rods 728 provide reinforcement for the die(s) 722. In one example, the plurality of rods 728 is formed from fiberglass. The plurality of rods 728 can be threaded on the ends and can be held in place by a plurality of nuts 736. The plurality of nuts 736 can be installed to apply tension to the plurality of rods 728. In some examples, the plurality of rods 728 extend longitudinally through the die(s) 722. In some examples, the plurality of rods 728 extend transversely through the die(s) 722. In some examples, the plurality of rods 728 extend both longitudinally and transversely through the die(s) 722.

The die cavity 724 is associated with an inert gas supply 738 or a vacuum space. Thus, during assembly (e.g., consolidation) of the structure 706, inert gas from the inert gas supply 738 can be present in the die cavity 724. In some examples, a vacuum cavity is formed.

The plurality of induction coils 726 generate magnetic flux 740. The magnetic flux 740 runs in a direction 742. The direction 742 can be substantially perpendicular to the plurality of induction coils 726. The direction 742 is non-parallel to at least a portion of the structure 706 in some examples. For example, the direction 742 can be substantially perpendicular to at least a portion of structure 706.

The structure 706 in some examples is formed of thermoplastic material 744. The structure 706 can include a first component 746 and a second component 748. The first component 746 and the second component 748 can be connected by a number of joints 750. The first component 746 is in the form of one or more skins 752 in some examples. The skin 752 can be positioned to be substantially parallel to the direction 742 of magnetic flux 740.

The second component 748 can have a portion 754 that is substantially non-parallel to the direction 742 of magnetic flux 740. In some examples, the second component 748 is in the form of a stiffener 756 (e.g., the stiffener 326).

The structure 706 includes a number of welding promoters 760. The welding promoters 760 are positioned in the joints 750 (e.g., at surfaces between two abutting components). Prior to welding, the welding promoters 760 are positioned such that the welding promoters 760 contact the surface of the first component 746 and the surface of the second component 748. After welding, the welding promoters 760 are contained in the joints 750 in some examples.

In some examples, the welding promoters 760 include the susceptors 328. The susceptors 328 are formed of a material configured to generate heat when exposed to the magnetic flux 740. The material of the susceptors 328 can be selected as described herein. The susceptors 328 can generate heat when exposed to the magnetic flux 740 generated by the plurality of induction coils 726 as described herein (e.g., apply heat to the joints 750 of the structure 706 during a welding process).

In some examples, the susceptors 328 take the form of wires 764. When the welding promoters 760 are placed between the first component 746 and the second component 748, the welding promoters 760 can be placed such that the wires 764 are substantially parallel to the direction 742 of the magnetic flux 740. In some examples, the welding promoters 760 take the form of welding tape 766 having the susceptors 328 in the form of the wires 764.

To weld the structure 706, a flux director 708 is placed into the die cavity 724 of the tool 702. The first component 746 and the second component 748 are placed in relation to the flux director 708 in the tool 702. The plurality of induction coils 726 then are activated to generate the magnetic flux 740. The flux director 708 directs magnetic flux 740 to the joints 750. In some examples, when the flux director 708 changes the direction 742 of the magnetic flux 740, the flux director 708 is referred to as focusing, directing, or channeling the magnetic flux 740. In some examples, the flux director 708 is an active flux director (e.g., an aluminum part that redirects or changes the course of the magnetic flux 740). In some examples, the flux director 708 is a passive flux director (e.g., a fiberglass part, such as the fiberglass composite perimeter edge closeout 318 that allows the magnetic flux 740 to pass through).

The flux director 708 includes a number of parts 768 that have material properties 772. The material properties 772 can include desirable properties for at least one of conductivity, machinability, melting temperature, elasticity, material cost, or other material characteristics of the flux director 708. The material properties 772 can include the material being magnetically opaque 774. A material can be selected for the parts 768 based on a frequency 776 of the magnetic flux 740. In some examples, the frequency 776 is in the range of 30 KHz to 350 KHz. As a result, magnetically opaque 774 means opaque to the magnetic flux 740 having the frequency 776 in the range of 30 KHz to 350 KHz in some examples. In one example, the flux director 708 is formed of aluminum or an aluminum alloy. The flux director 708 is formed to having dielectric material properties to control directional magnetic flux induced co-cure or thermal welding as described in more detail herein.

The parts 768 can include a base 778 and a cover 780. The base 778 can include one or more cavities 782, which can be partially formed by the cover 780. The structure 706 can be inserted into the one or more cavities 782. The cover 780 (e.g., a vacuum bag) can be placed over the structure 706.

The illustration of the manufacturing environment 700 is not meant to imply physical or architectural limitations to the manner in which an illustrative example is implemented. Other components in addition to or in place of the ones illustrated can be used. Some components can be removed. Also, the blocks are presented to illustrate some functional components. One or more of these blocks can be combined, divided, or combined and divided into different blocks when implemented in an illustrative example.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for forming or assembling thermoplastic sandwich panels.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps) is within the scope of aspects of the disclosure.

The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

The following clauses describe further aspects:

Clause Set A:

A1. A composite sandwich panel comprising:
a first composite part;
a second composite part;
a plurality of stiffeners extending between the first and second composite parts; and
a fiberglass composite perimeter edge closeout positioned along one or more edges of the first and second composite parts, the fiberglass composite perimeter edge closeout configured to control a magnetic flux to bond the first and second composite parts to the plurality of stiffeners.

A2. The composite sandwich panel of clause A1, further comprising a plurality of susceptors positioned between one or more surfaces of (i) the first and second composite parts and (ii) the plurality of stiffeners.

A3. The composite sandwich panel of clause A2, wherein the fiberglass composite perimeter edge closeout is configured to direct a magnetic flux to the plurality of susceptors.

A4. The composite sandwich panel of clause A1, wherein the fiberglass composite perimeter edge closeout is formed from a material having dielectric material properties to control directional flux induced welding of the first and second composite parts to the plurality of stiffeners.

A5. The composite sandwich panel of clause A1, wherein the fiberglass composite perimeter edge closeout comprises thermoplastic reinforced fiberglass and the first and second composite parts are inner and outer skins of an aircraft landing gear door.

A6. The composite sandwich panel of clause A1, wherein the fiberglass composite perimeter edge closeout comprises an angled body between two planar ends.

Clause Set B:

B1. A perimeter edge closeout comprising:
a body formed from a material having dielectric properties to control magnetic flux into a sandwich panel, the body being sized and shaped to form edges of the sandwich panel; and
a pair of ends extending from the body, the pair of ends configured to abut edges of the sandwich panel and bond thereto to form the edges of the sandwich panel as the magnetic flux is being controlled.

B2. The perimeter edge closeout of clause B1, further comprising a plurality of susceptors configured to be positioned between the pair of ends and one or more surfaces of the sandwich panel and bond the pair of ends to the edges of the sandwich panel as magnetic flux flows into the sandwich panel.

B3. The perimeter edge closeout of clause B1, wherein the sandwich panel comprises a plurality of stiffeners having a plurality of susceptors positioned between ends of the plurality of stiffeners and one or more surfaces of the sandwich panel, and the body is configured to direct the magnetic flux to the plurality of susceptors.

B4. The perimeter edge closeout of clause B1, wherein the pair of ends comprise parallel end portions.

B5. The perimeter edge closeout of clause B1, wherein the body is formed from a material having dielectric properties to control directional flux induced welding of the pair of ends to the sandwich panel in a single manufacturing step.

B6. The perimeter edge closeout of clause B1, wherein the perimeter edge closeout is formed from fiberglass reinforced thermoplastic.

B7. The perimeter edge closeout of clause B1, wherein the body is angled between the pair of ends.

B8. The perimeter edge closeout of clause B1, wherein the pair of ends are planar.

B9. The perimeter edge closeout of clause B1, wherein the sandwich panel is a portion of an aircraft landing gear door.

Clause Set C:

C1. A method for forming a composite sandwich panel, the method comprising:
positioning components of the composite sandwich panel with respect to a plurality of induction coils;
positioning a fiberglass composite perimeter edge closeout edges of the components of the composite sandwich panel, the fiberglass composite perimeter edge closeout configured to direct magnetic flux to within the components of the composite sandwich panel; and
generating a magnetic flux using the plurality of induction coils to bond the components of the composite sandwich panel.

C2. The method of clause C1, wherein the composite sandwich panel comprises a plurality of stiffeners extending between inner and outer skins of the composite sandwich panel, and a plurality of susceptors positioned between one or more surfaces of (i) the inner and outer skins and (ii) the plurality of stiffeners, the fiberglass composite perimeter edge closeout configured to direct the magnetic flux to the plurality of susceptors.

C3. The method of clause C2, wherein the fiberglass composite perimeter edge closeout is formed from a material having dielectric material properties to control directional flux induced welding of the inner and outer skins to the plurality of stiffeners.

C4. The method of clause C1, wherein the fiberglass composite perimeter edge closeout comprises an angled body between two planar ends.

C5. The method of clause C1, wherein the composite sandwich panel comprises an aircraft landing gear door.

What is claimed is:

1. A composite sandwich panel comprising:
a first composite part;
a second composite part;
a plurality of stiffeners extending between the first and second composite parts; and
a fiberglass composite perimeter edge closeout positioned along one or more edges of the first and second composite parts, the fiberglass composite perimeter edge closeout having an angled body extending between a pair of planar ends such that the angled body is sloped from one end of the pair of planar ends to another end of the pair of planar ends, the pair of planar ends extending along a surface of the first and second composite parts, the fiberglass composite perimeter edge closeout configured to control a directional magnetic flux to inductively bond the first and second composite parts to the plurality of stiffeners and close open ends of and form edges between the bonded first and second composite parts as the directional magnetic flux is being directionally controlled to re-direct the directional magnetic flux within the composite sandwich panel where an energy field acts on a plurality of susceptor resin assemblies placed at co-bonding interface flange faces to weld the fiberglass composite perimeter edge closeout, the plurality of stiffeners, the first composite part, and the second composite part into an assembled single part structure.

2. The composite sandwich panel of claim 1, wherein one or more susceptor resin assemblies of the plurality of susceptor resin assemblies are positioned between one or more surfaces of (i) the first and second composite parts and (ii) the plurality of stiffeners.

3. The composite sandwich panel of claim 2, wherein the fiberglass composite perimeter edge closeout is configured to direct the direction magnetic flux to the plurality of susceptor resin assemblies.

4. The composite sandwich panel of claim 1, wherein the fiberglass composite perimeter edge closeout is formed from a material having dielectric material properties to control directional flux induced welding of the first and second composite parts to the plurality of stiffeners.

5. The composite sandwich panel of claim 1, wherein the fiberglass composite perimeter edge closeout comprises a fiberglass reinforced thermoplastic and the first and second composite parts are inner and outer skins of an aircraft landing gear door.

6. The composite sandwich panel of claim 1, wherein the fiberglass composite perimeter edge closeout comprises the angled body between the pair of planar ends, wherein the angled body extends in a single plane between the pair of planar ends and together form an "S" shaped profile.

7. A composite sandwich panel comprising:
    a first composite part;
    a second composite part;
    a fiberglass composite perimeter edge closeout positioned along one or more edges of the first and second composite parts, the fiberglass composite perimeter edge closeout comprising:
        a body formed from a material having dielectric properties to control a directional magnetic flux to inductively bond the first and second composite parts to the fiberglass composite perimeter edge closeout, the body being angled, and sized and shaped to form edges of the composite sandwich panel; and
        a pair of planar ends extending from the body, the body being angled between the pair of planar ends such that the body is sloped from one end of the pair planar ends to another end of the pair of planar ends, the pair of planar ends configured to abut edges of and extend along a surface of the composite sandwich panel and inductively bond thereto to close open ends of and form the edges between the bonded first and second composite parts as the directional magnetic flux is being directionally controlled to re-direct the directional magnetic flux within the composite sandwich panel where an energy field acts on a plurality of susceptor resin assemblies placed at co-bonding interface flange faces to weld the fiberglass composite perimeter edge closeout and the first and second composite parts into an assembled single part structure.

8. The composite sandwich panel of claim 7, wherein the plurality of susceptor resin assemblies is configured to be positioned between the pair of planar ends and one or more surfaces of the sandwich panel, and bond the pair of planar ends to the edges of the first and second composite parts as the directional magnetic flux flows into the first and second composite parts.

9. The composite sandwich panel of claim 7, wherein the composite sandwich panel further comprises a plurality of stiffeners having one or more susceptor resin assemblies of the plurality of susceptor resin assemblies positioned between ends of the plurality of stiffeners and one or more surfaces of the first and second composite parts, and the body is configured to direct the directional magnetic flux to the plurality of susceptor resin assemblies.

10. The composite sandwich panel of claim 7, wherein the pair of planar ends comprise parallel end portions configured to bond to abutting surfaces of the first and second composite parts.

11. The composite sandwich panel of claim 7, wherein the body is formed from the material having dielectric properties to control directional flux induced welding of the pair of planar ends to the first and second composite parts in a single manufacturing step to inductively bond the body to the first and second composite parts to form the assembled single part structure and redirect the directional magnetic flux within the first and second composite parts, and having dielectric properties that block the directional magnetic flux from encountering the first and second composite parts at a substantially non-parallel angle.

12. The composite sandwich panel of claim 7, wherein the fiberglass composite perimeter edge closeout is formed from fiberglass reinforced thermoplastic having properties selected based on at least one of a conductivity, a melting temperature, and a frequency relating to magnetic flux inductive welding.

13. The composite sandwich panel of claim 7, wherein the body is angled between the pair of planar ends to have a constant slope, the pair of planar ends of the pair of planar ends being in different parallel planes, each planar end in the pair of planar ends having first and second surfaces, the first and second surface being opposing surfaces, the second surfaces of the pair of planar ends bonded with offset ends of the first and second composite parts, and the pair of planar ends extending from the body at an angle greater than ninety degrees.

14. The composite sandwich panel of claim 7, wherein the body extends in a single plane between the pair of planar ends and together form an "S" shaped profile.

15. An aircraft landing gear door comprising the composite sandwich panel of claim 7, wherein the first and second composite parts are configured as consolidated thermoplastic inner and outer skins of the aircraft landing gear door.

* * * * *